(12) United States Patent
Liang et al.

(10) Patent No.: US 10,693,731 B2
(45) Date of Patent: Jun. 23, 2020

(54) FLOW ENTRY MANAGEMENT METHOD AND DEVICE

(71) Applicant: Huawei Technologies Co., Ltd., Shenzhen (CN)

(72) Inventors: Jianyao Liang, Hangzhou (CN); Qiang Feng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 15/293,376

(22) Filed: Oct. 14, 2016

(65) Prior Publication Data
US 2017/0034005 A1  Feb. 2, 2017

Related U.S. Application Data

(63) Continuation of application No. PCT/CN2014/075481, filed on Apr. 16, 2014.

(51) Int. Cl.
*G06F 15/173* (2006.01)
*H04L 12/24* (2006.01)
(Continued)

(52) U.S. Cl.
CPC .............. *H04L 41/12* (2013.01); *H04L 45/38* (2013.01); *H04L 69/08* (2013.01)

(58) Field of Classification Search
CPC .......... H04L 41/12; H04L 45/38; H04L 69/08
(Continued)

(56) References Cited

U.S. PATENT DOCUMENTS 7,366,812 B2 *  4/2008  Lambourn .......... G06F 21/6218
                                                      709/217
7,809,123 B2  10/2010  Karnalkar et al.
(Continued)

FOREIGN PATENT DOCUMENTS

CN        1852261 A   10/2006
CN      101631116 A    1/2010
(Continued)

OTHER PUBLICATIONS

Foreign Communication From a Counterpart Application, Chinese Application No. 201480000415.7, Chinese Office Action dated Jan. 17, 2018, 5 pages.
(Continued)

*Primary Examiner* — Liang Che A Wang
*Assistant Examiner* — Kaylee J Huang
(74) *Attorney, Agent, or Firm* — Conley Rose, P.C.

(57) ABSTRACT

A flow entry management method comprises receiving a management instruction for any flow entry, where the management instruction is initiated by a controller connected to a switch, wherein the switch may first determine, according to an obtained management authority level of the the controller relative to the switch and a security level of the any flow entry, when the management authority level of the any controller relative to the the switch is not lower than the security level of the a flow entry corresponding to the management instruction initiated by the any controller, that the controller has an authority to perform corresponding management on the any flow entry, and perform corresponding management on the any flow entry according to the management instruction initiated by the controller.

18 Claims, 2 Drawing Sheets

(51) Int. Cl.
*H04L 29/06* (2006.01)
*H04L 12/721* (2013.01)

(58) Field of Classification Search
USPC .............................. 709/223, 226, 204, 220
See application file for complete search history.

(56) References Cited

U.S. PATENT DOCUMENTS

| | | | |
|---|---|---|---|
| 8,261,090 | B1 | 9/2012 | Matsuoka |
| 2004/0243718 | A1* | 12/2004 | Fujiyoshi ................ H04L 45/06 709/237 |
| 2013/0114615 | A1 | 5/2013 | Suemitsu et al. |
| 2015/0006581 | A1 | 1/2015 | Luo |
| 2015/0036683 | A1* | 2/2015 | Iihoshi .................. H04W 12/08 370/389 |
| 2015/0124595 | A1* | 5/2015 | Yamagata ............... H04L 63/02 370/230 |
| 2015/0169345 | A1* | 6/2015 | DeCusatis .......... G06F 9/45545 718/1 |
| 2016/0191406 | A1* | 6/2016 | Xiao .................. H04L 12/6418 370/235 |
| 2016/0218957 | A1* | 7/2016 | Liang ..................... H04L 45/64 |

FOREIGN PATENT DOCUMENTS

| | | |
|---|---|---|
| CN | 102859952 A | 1/2013 |
| CN | 103620616 A | 3/2014 |
| EP | 1657616 A1 | 5/2006 |
| WO | 2011132568 A1 | 10/2011 |
| WO | 2013042598 A1 | 3/2013 |

OTHER PUBLICATIONS

"OpenFlow Switch Specification," Open Networking Foundation, Version 1.3.4, Protocol version 0x04, Mar. 27, 2014, 171 pages.
Foreign Communication From a Counterpart Application, European Application No. 14889738.2, Extended European Search Report dated Mar. 20, 2017, 6 pages.
Foreign Communication From a Counterpart Application, PCT Application No. PCT/CN2014/075481, English Translation of International Search Report dated Jan. 28, 2015, 2 pages.
Foreign Communication From a Counterpart Application, PCT Application No. PCT/CN2014/075481, English Translation of Written Opinion dated Jan. 28, 2015, 6 pages.

* cited by examiner

FLOW ENTRY MANAGEMENT METHOD AND DEVICE

CROSS-REFERENCE TO RELATED APPLICATIONS

This application is a continuation of International Application No. PCT/CN2014/075481, filed on Apr. 16, 2014, the disclosure of which is hereby incorporated by reference in its entirety.

TECHNICAL FIELD

The present disclosure relates to the field of Software-Defined Networking (SDN) technologies, and in particular, to a flow entry management method and device based on the OPENFLOW protocol.

BACKGROUND

Currently, the OPENFLOW protocol is the most popular protocol in the SDN field. In the OPENFLOW protocol, a control function of a network device is separated from a forwarding function of the network device. Further, all control functions are centralized on a remote controller (Controller) for implementation, while an OPENFLOW switch (Switch) may be responsible for only operations of simple high-speed data forwarding and the like. In a running process of the OPENFLOW switch, data forwarding of the OPENFLOW switch is based on a flow table, and the controller may control the flow table on the OPENFLOW switch using an OPENFLOW protocol interface specified in advance, thereby achieving an objective of data forwarding control.

However, currently, the OPENFLOW protocol still lacks authority control over each flow entry in the flow table. Therefore, a problem that a flow entry is arbitrarily modified may be caused such that system security is reduced.

For example, in some scenarios, an OPENFLOW switch stores some default important flow entries. For example, in a plug-and-play ad hoc network scenario, an OPENFLOW switch stores a default flow entry related to an ad hoc network, and if the default flow entry is deleted by the OPENFLOW switch according to a control instruction (which may also be referred to as a management instruction) delivered by a controller, an ad hoc network function of the OPENFLOW switch becomes invalid. For another example, in a scenario in which multiple controllers operate a same OPENFLOW switch, if a flow entry related to controller A is modified or deleted by the OPENFLOW switch according to a control instruction delivered by controller B, controller A cannot continue to perform a corresponding control operation according to the flow entry, and corresponding processing on controller A is affected.

Therefore, currently, it is urgent to provide a method for performing corresponding authority control over a flow entry in the OPENFLOW protocol to solve the foregoing problems.

SUMMARY

Embodiments of the present disclosure provide a flow entry management method and device to solve a currently existing problem of low system security caused by lack of authority control over a flow entry.

According to a first aspect, a flow entry management method is provided and applied to a flow entry management system, where the flow entry management system includes at least one switch and at least one controller, where for any switch in the at least one switch, one or more controllers in the at least one controller are connected to the any switch, and a corresponding management authority level relative to the any switch is set for each controller in the one or more controllers connected to the any switch, and the method includes, after receiving a management instruction initiated by a first controller for a first flow entry, obtaining, by a first switch, a management authority level of the first controller relative to the first switch and a security level of the first flow entry, where, corresponding to different management instructions, corresponding security levels are respectively set for the first flow entry, the security level is used to indicate a management authority level that the controller should have for managing the first flow entry, the first switch is any switch in the at least one switch, the first controller is any controller in one or more controllers connected to the first switch, and the first flow entry is any to-be-created flow entry carried in the management instruction initiated by the first controller or is any created flow entry stored on the first switch, and comparing, by the first switch, the management authority level of the first controller relative to the first switch with the security level of the first flow entry corresponding to the management instruction initiated by the first controller, and if it is determined that the management authority level of the first controller relative to the first switch is not lower than the security level of the first flow entry corresponding to the management instruction initiated by the first controller, determining that the first controller has an authority to perform corresponding management on the first flow entry, and performing corresponding management on the first flow entry according to the management instruction initiated by the first controller.

With reference to the first aspect, in a first possible implementation manner of the first aspect, the method further includes, if the first switch determines that the management authority level of the first controller relative to the first switch is lower than the security level of the first flow entry corresponding to the management instruction initiated by the first controller, determining that the first controller does not have the authority to perform corresponding management on the first flow entry, and refusing to execute the operation of performing corresponding management on the first flow entry according to the management instruction initiated by the first controller.

With reference to the first aspect or the first possible implementation manner of the first aspect, in a second possible implementation manner of the first aspect, the management instruction initiated by the first controller carries a network protocol address of the first controller and a match field of the first flow entry, the obtaining a management authority level of the first controller relative to the first switch includes querying, according to the network protocol address of the first controller that is carried in the management instruction initiated by the first controller and a preset association relationship, for a management authority level corresponding to the network protocol address of the first controller that is carried in the management instruction initiated by the first controller, where the preset association relationship exists between a management authority level that is of each controller connected to the first switch and is relative to the first switch, and a network protocol address of each controller connected to the first switch, and using the found management authority level as the obtained management authority level of the first controller relative to the first switch, where the preset association relationship between the management authority level that is of each controller connected to the first switch and is relative to the first switch, and the network protocol address of each controller connected to the first switch is stored on the first switch, and the obtaining a security level of the first flow entry includes querying, according to the match field of the first flow entry that is carried in the management instruction initiated by the first controller and a preset association relationship between a security level of each flow entry and a match field of each flow entry, for a security level corresponding to the match field of the first flow entry that is carried in the management instruction initiated by the first controller, and using the found security level as the obtained security level of the first flow entry, where when the first flow entry is any to-be-created flow entry carried in the management instruction initiated by the first controller, a preset association relationship between the security level of the first flow entry and the match field of the first flow entry is carried in the management instruction initiated by the first controller, or when the first flow entry is any created flow entry stored on the first switch, a preset association relationship between the security level of the first flow entry and the match field of the first flow entry is stored on the first switch.

With reference to the first aspect or the first possible implementation manner of the first aspect, in a third possible implementation manner of the first aspect, the obtained security level of the first flow entry includes at least a first security level of the first flow entry corresponding to a content modification management instruction and/or a second security level of the first flow entry corresponding to a content viewing management instruction, and the content modification management instruction includes at least one or more of a creation instruction, a modification instruction, or a deletion instruction, and the content viewing management instruction includes at least a viewing instruction.

With reference to the third possible implementation manner of the first aspect, in a fourth possible implementation manner of the first aspect, the comparing the management authority level of the first controller relative to the first switch with the security level of the first flow entry corresponding to the management instruction initiated by the first controller, and if it is determined that the management authority level of the first controller relative to the first switch is not lower than the security level of the first flow entry corresponding to the management instruction initiated by the first controller, determining that the first controller has an authority to perform corresponding management on the first flow entry, includes, when the management instruction initiated by the first controller is a creation instruction, a modification instruction, or a deletion instruction, comparing the management authority level of the first controller relative to the first switch with the first security level of the first flow entry, and if it is determined that the management authority level of the first controller relative to the first switch is not lower than the first security level of the first flow entry, determining that the first controller has an authority to perform corresponding creation, modification, or deletion on the first flow entry, or when the management instruction initiated by the first controller is a viewing instruction, comparing the management authority level of the first controller relative to the first switch with the second security level of the first flow entry, and if it is determined that the management authority level of the first controller relative to the first switch is not lower than the second security level of the first flow entry, determining that the first controller has an authority to view the first flow entry.

With reference to the third possible implementation manner of the first aspect, in a fifth possible implementation manner of the first aspect, when it is determined that the first controller has the authority to perform corresponding management on the first flow entry, the performing corresponding management on the first flow entry according to the management instruction initiated by the first controller includes, if it is determined that the management instruction initiated by the first controller is a creation instruction, creating the first flow entry locally on the first switch according to the management instruction initiated by the first controller, and writing the security level of the first flow entry that is carried in the management instruction initiated by the first controller, into a pre-added flow entry authority field of the first flow entry, or if it is determined that the management instruction initiated by the first controller is a modification instruction or a deletion instruction, searching, according to the management instruction initiated by the first controller, for the first flow entry stored locally on the first switch, and performing corresponding modification or deletion processing on the found first flow entry, or if it is determined that the management instruction initiated by the first controller is a viewing instruction, searching, according to the management instruction initiated by the first controller, for the first flow entry stored locally on the first switch, and returning the found first flow entry to the first controller.

With reference to the fourth possible implementation manner of the first aspect, in a sixth possible implementation manner of the first aspect, when the management instruction initiated by the first controller is a creation instruction, when or after it is determined that the management authority level of the first controller relative to the first switch is not lower than the first security level of the first flow entry, and before corresponding management is performed on the first flow entry according to the management instruction initiated by the first controller, the method further includes comparing the first security level of the first flow entry with the second security level of the first flow entry, and determining that the first security level of the first flow entry is not lower than the second security level of the first flow entry.

According to a second aspect, a switch is provided and applied to a flow entry management system, where the flow entry management system includes at least one such switch and at least one controller, where one or more controllers in the at least one controller are connected to the switch, and a corresponding management authority level relative to the switch is set for each controller in the one or more controllers connected to the switch, and the switch includes an instruction receiving module configured to receive a management instruction initiated by a first controller for a first flow entry, where the first controller is any controller in the one or more controllers connected to the switch, and the first flow entry is any to-be-created flow entry carried in the management instruction initiated by the first controller or is any created flow entry stored on the switch, an authority obtaining module configured to obtain a management authority level of the first controller relative to the switch and a security level of the first flow entry after the instruction receiving module receives the management instruction initiated by the first controller, where, corresponding to different management instructions, corresponding security levels are respectively set for the first flow entry, and the security level is used to indicate a management authority level that the controller should have for managing the first flow entry, an authority comparison module configured to compare, according to the management authority level of the first controller relative to the switch and the security level of the first flow entry that are obtained by the authority obtaining module, the management authority level of the first controller relative to the switch with the security level of the first flow entry corresponding to the management instruction initiated by the first controller, to determine whether the management authority level of the first controller relative to the switch is not lower than the security level of the first flow entry corresponding to the management instruction initiated by the first controller, and an execution module configured to, when the authority comparison module determines that the management authority level of the first controller relative to the switch is not lower than the security level of the first flow entry corresponding to the management instruction initiated by the first controller, determine that the first controller has an authority to perform corresponding management on the first flow entry, and perform corresponding management on the first flow entry according to the management instruction initiated by the first controller.

With reference to the second aspect, in a first possible implementation manner of the second aspect, the execution module is further configured to, when the authority comparison module determines that the management authority level of the first controller relative to the switch is lower than the security level of the first flow entry corresponding to the management instruction initiated by the first controller, determine that the first controller does not have the authority to perform corresponding management on the first flow entry, and refuse to execute the operation of performing corresponding management on the first flow entry according to the management instruction initiated by the first controller.

With reference to the second aspect or the first possible implementation manner of the second aspect, in a second possible implementation manner of the second aspect, the management instruction initiated by the first controller and received by the instruction receiving module carries a network protocol address of the first controller and a match field of the first flow entry, and the authority obtaining module is configured to query, according to the network protocol address of the first controller that is carried in the management instruction initiated by the first controller and a preset association relationship, for a management authority level corresponding to the network protocol address of the first controller that is carried in the management instruction initiated by the first controller, where the preset association relationship exists between the management authority level that is of each controller connected to the switch and is relative to the switch, and a network protocol address of each controller connected to the switch, and use the found management authority level as the obtained management authority level of the first controller relative to the switch, where the preset association relationship between the management authority level that is of each controller connected to the switch and is relative to the switch, and the network protocol address of each controller connected to the switch is stored on the switch, and configured to query, according to the match field of the first flow entry that is carried in the management instruction initiated by the first controller and a preset association relationship between a security level of each flow entry and a match field of each flow entry, for a security level corresponding to the match field of the first flow entry that is carried in the management instruction initiated by the first controller, and use the found security level as the obtained security level of the first flow entry, where when the first flow entry is any to-be-created flow entry carried in the management instruction initiated by the first controller, a preset association relationship between the security level of the first flow entry and the match field of the first flow entry is carried in the management instruction initiated by the first controller, or when the first flow entry is any created flow entry stored on the switch, a preset association relationship between the security level of the first flow entry and the match field of the first flow entry is stored on the switch.

With reference to the second aspect or the first possible implementation manner of the second aspect, in a third possible implementation manner of the second aspect, the security level of the first flow entry that is obtained by the authority obtaining module includes at least a first security level of the first flow entry corresponding to a content modification management instruction and/or a second security level of the first flow entry corresponding to a content viewing management instruction, and the content modification management instruction includes at least one or more of a creation instruction, a modification instruction, or a deletion instruction, and the content viewing management instruction includes at least a viewing instruction.

With reference to the third possible implementation manner of the second aspect, in a fourth possible implementation manner of the second aspect, the authority comparison module is configured to, when the management instruction initiated by the first controller is a creation instruction, a modification instruction, or a deletion instruction, compare the management authority level of the first controller relative to the switch with the first security level of the first flow entry, and if it is determined that the management authority level of the first controller relative to the switch is not lower than the first security level of the first flow entry, determine that the first controller has an authority to perform corresponding creation, modification, or deletion on the first flow entry, or configured to, when the management instruction initiated by the first controller is a viewing instruction, compare the management authority level of the first controller relative to the switch with the second security level of the first flow entry, and if it is determined that the management authority level of the first controller relative to the switch is not lower than the second security level of the first flow entry, determine that the first controller has an authority to view the first flow entry.

With reference to the third possible implementation manner of the second aspect, in a fifth possible implementation manner of the second aspect, the execution module is configured to, when the authority comparison module determines that the first controller has the authority to perform corresponding management on the first flow entry, if it is determined that the management instruction initiated by the first controller is a creation instruction, create the first flow entry locally on the switch according to the management instruction initiated by the first controller, and write the security level of the first flow entry that is carried in the management instruction initiated by the first controller, into a pre-added flow entry authority field of the first flow entry, or if it is determined that the management instruction initiated by the first controller is a modification instruction or a deletion instruction, search, according to the management instruction initiated by the first controller, for the first flow entry stored locally on the switch, and perform corresponding modification or deletion processing on the found first flow entry, or if it is determined that the management instruction initiated by the first controller is a viewing instruction, search, according to the management instruction initiated by the first controller, for the first flow entry stored locally on the switch, and return the found first flow entry to the first controller.

With reference to the fourth possible implementation manner of the second aspect, in a sixth possible implementation manner of the second aspect, the authority comparison module is further configured to, when the management instruction initiated by the first controller is a creation instruction, when or after it is determined that the management authority level of the first controller relative to the switch is not lower than the first security level of the first flow entry, and before corresponding management is performed on the first flow entry according to the management instruction initiated by the first controller, compare the first security level of the first flow entry with the second security level of the first flow entry, and determine that the first security level of the first flow entry is not lower than the second security level of the first flow entry.

According to a third aspect, a switch is provided and applied to a flow entry management system, where the flow entry management system includes at least one such switch and at least one controller, where one or more controllers in the at least one controller are connected to the switch, and a corresponding management authority level relative to the switch is set for each controller in the one or more controllers connected to the switch, and the switch includes a receiver configured to receive a management instruction initiated by a first controller for a first flow entry, where the first controller is any controller in the one or more controllers connected to the switch, and the first flow entry is any to-be-created flow entry carried in the management instruction initiated by the first controller or is any created flow entry stored on the switch, and a processor configured to, after the receiver receives the management instruction initiated by the first controller, obtain a management authority level of the first controller relative to the switch and a security level of the first flow entry, compare the management authority level of the first controller relative to the switch with the security level of the first flow entry corresponding to the management instruction initiated by the first controller, and when it is determined that the management authority level of the first controller relative to the switch is not lower than the security level of the first flow entry corresponding to the management instruction initiated by the first controller, determine that the first controller has an authority to perform corresponding management on the first flow entry, and perform corresponding management on the first flow entry according to the management instruction initiated by the first controller, where corresponding to different management instructions, corresponding security levels are respectively set for the first flow entry, and the security level is used to indicate a management authority level that the controller should have for managing the first flow entry.

With reference to the third aspect, in a first possible implementation manner of the third aspect, the processor is further configured to, when it is determined that the management authority level of the first controller relative to the switch is lower than the security level of the first flow entry corresponding to the management instruction initiated by the first controller, determine that the first controller does not have the authority to perform corresponding management on the first flow entry, and refuse to execute the operation of performing corresponding management on the first flow entry according to the management instruction initiated by the first controller.

With reference to the third aspect or the first possible implementation manner of the third aspect, in a second possible implementation manner of the third aspect, the management instruction initiated by the first controller and received by the receiver carries a network protocol address of the first controller and a match field of the first flow entry, and the processor is configured to query, according to the network protocol address of the first controller that is carried in the management instruction initiated by the first controller and a preset association relationship, for a management authority level corresponding to the network protocol address of the first controller that is carried in the management instruction initiated by the first controller, where the preset association relationship exists between the management authority level that is of each controller connected to the switch and is relative to the switch, and a network protocol address of each controller connected to the switch, and use the found management authority level as the obtained management authority level of the first controller relative to the switch, where the preset association relationship between the management authority level that is of each controller connected to the switch and is relative to the switch, and the network protocol address of each controller connected to the switch is stored on the switch, and configured to query, according to the match field of the first flow entry that is carried in the management instruction initiated by the first controller and a preset association relationship between a security level of each flow entry and a match field of each flow entry, for a security level corresponding to the match field of the first flow entry that is carried in the management instruction initiated by the first controller, and use the found security level as the obtained security level of the first flow entry, where when the first flow entry is any to-be-created flow entry carried in the management instruction initiated by the first controller, a preset association relationship between the security level of the first flow entry and the match field of the first flow entry is carried in the management instruction initiated by the first controller, or when the first flow entry is any created flow entry stored on the switch, a preset association relationship between the security level of the first flow entry and the match field of the first flow entry is stored on the switch.

With reference to the third aspect or the first possible implementation manner of the third aspect, in a third possible implementation manner of the third aspect, the security level of the first flow entry that is obtained by the processor includes at least a first security level of the first flow entry corresponding to a content modification management instruction and/or a second security level of the first flow entry corresponding to a content viewing management instruction, and the content modification management instruction includes at least one or more of a creation instruction, a modification instruction, or a deletion instruction, and the content viewing management instruction includes at least a viewing instruction.

With reference to the third possible implementation manner of the third aspect, in a fourth possible implementation manner of the third aspect, the processor is configured to, when the management instruction initiated by the first controller is a creation instruction, a modification instruction, or a deletion instruction, compare the management authority level of the first controller relative to the switch with the first security level of the first flow entry, and if it is determined that the management authority level of the first controller relative to the switch is not lower than the first security level of the first flow entry, determine that the first controller has an authority to perform corresponding creation, modification, or deletion on the first flow entry, or configured to, when the management instruction initiated by the first controller is a viewing instruction, compare the management authority level of the first controller relative to the switch with the second security level of the first flow entry, and if it is determined that the management authority level of the first controller relative to the switch is not lower than the second security level of the first flow entry, determine that the first controller has an authority to view the first flow entry.

With reference to the third possible implementation manner of the third aspect, in a fifth possible implementation manner of the third aspect, the processor is configured to, when it is determined that the first controller has the authority to perform corresponding management on the first flow entry, if it is determined that the management instruction initiated by the first controller is a creation instruction, create the first flow entry locally on the switch according to the management instruction initiated by the first controller, and write the security level of the first flow entry that is carried in the management instruction initiated by the first controller, into a pre-added flow entry authority field of the first flow entry, or if it is determined that the management instruction initiated by the first controller is a modification instruction or a deletion instruction, search, according to the management instruction initiated by the first controller, for the first flow entry stored locally on the switch, and perform corresponding modification or deletion processing on the found first flow entry, or if it is determined that the management instruction initiated by the first controller is a viewing instruction, search, according to the management instruction initiated by the first controller, for the first flow entry stored locally on the switch, and return the found first flow entry to the first controller.

With reference to the fourth possible implementation manner of the third aspect, in a sixth possible implementation manner of the third aspect, the processor is further configured to, when the management instruction initiated by the first controller is a creation instruction, when or after it is determined that the management authority level of the first controller relative to the switch is not lower than the first security level of the first flow entry, and before corresponding management is performed on the first flow entry according to the management instruction initiated by the first controller, compare the first security level of the first flow entry with the second security level of the first flow entry, and determine that the first security level of the first flow entry is not lower than the second security level of the first flow entry.

In the technical solutions of the embodiments of the present disclosure, after receiving a management instruction for any flow entry, where the management instruction is initiated by any controller connected to any switch, the any switch may first determine, according to an obtained management authority level of the any controller relative to the any switch and a security level of the any flow entry, whether the management authority level of the any controller relative to the any switch is not lower than the security level of the any flow entry corresponding to the management instruction initiated by the any controller, and when a determining result is yes, determine that the any controller has an authority to perform corresponding management on the any flow entry, and perform corresponding management on the any flow entry according to the management instruction initiated by the any controller, thereby achieving an objective of effectively protecting the flow entry and further improving system security on a basis of avoiding an operation phenomenon of arbitrarily deleting or modifying the flow entry and the like.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
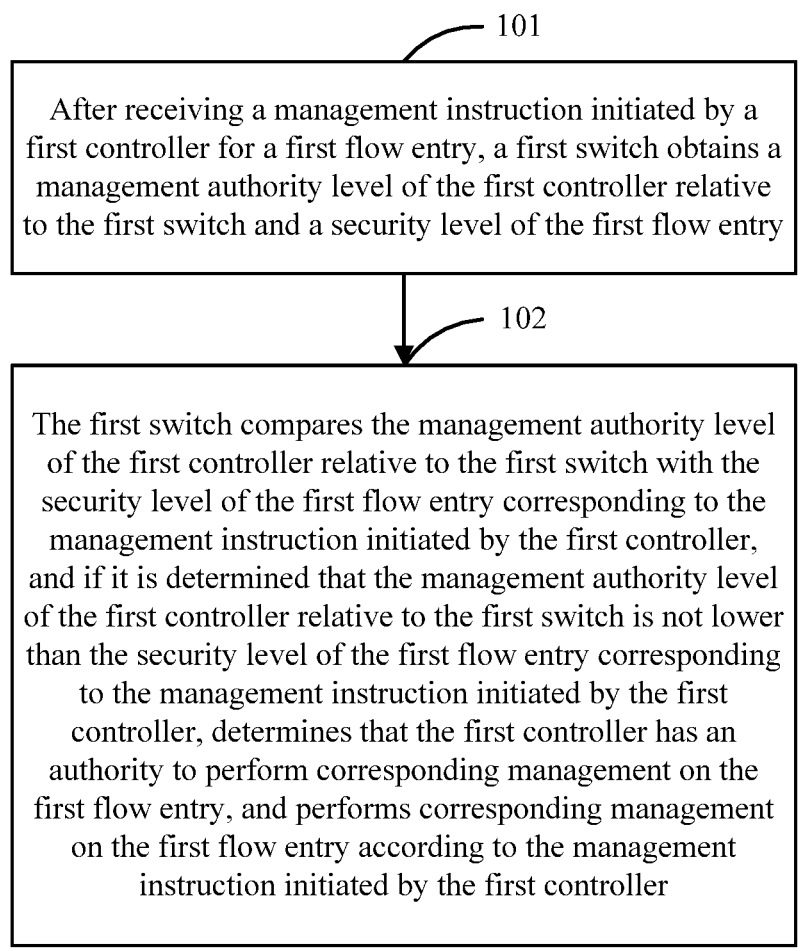
FIG. 1 is a schematic flowchart according to Embodiment 1 of the present disclosure.

Embodiments of the present disclosure provide a flow entry management method and device. The method may be applied to a flow entry management system. The flow entry management system may include at least one switch and at least one controller, where for any switch in the at least one switch, one or more controllers in the at least one controller are connected to the any switch, and a corresponding management authority level relative to the any switch is set for each controller in the one or more controllers connected to the any switch. In an embodiment, the method includes, after receiving a management instruction initiated by a first controller for a first flow entry, obtaining, by a first switch, a management authority level of the first controller relative to the first switch and a security level of the first flow entry, where, corresponding to different management instructions, corresponding security levels are respectively set for the first flow entry, the security level is used to indicate a management authority level that the controller should have for managing the first flow entry, the first switch is any switch in the at least one switch, the first controller is any controller in one or more controllers connected to the first switch, and the first flow entry is any to-be-created flow entry carried in the management instruction initiated by the first controller or is any created flow entry stored on the first switch, and comparing, by the first switch, the management authority level of the first controller relative to the first switch with the security level of the first flow entry corresponding to the management instruction initiated by the first controller, and if it is determined that the management authority level of the first controller relative to the first switch is not lower than the security level of the first flow entry corresponding to the management instruction initiated by the first controller, determining that the first controller has an authority to perform corresponding management on the first flow entry, and performing corresponding management on the first flow entry according to the management instruction initiated by the first controller.

In the technical solutions of the embodiments of the present disclosure, after receiving a management instruction for any flow entry, where the management instruction is initiated by any controller connected to any switch, the any switch may first determine, according to an obtained management authority level of the any controller relative to the any switch and a security level of the any flow entry, whether the management authority level of the any controller relative to the any switch is not lower than the security level of the any flow entry corresponding to the management instruction initiated by the any controller, and when a determining result is yes, determine that the any controller has an authority to perform corresponding management on the any flow entry, and perform corresponding management on the any flow entry according to the management instruction initiated by the any controller, thereby achieving an objective of effectively protecting the flow entry and further improving system security on a basis of avoiding an operation phenomenon of arbitrarily deleting or modifying the flow entry and the like.

To make the objectives, technical solutions, and advantages of the present disclosure clearer, the following further describes the present disclosure in detail with reference to the accompanying drawings. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Embodiment 1

Embodiment 1 of the present disclosure provides a flow entry management method. As shown in FIG. 1, FIG. 1 is a schematic flowchart of the flow entry management method according to Embodiment 1 of the present disclosure. The flow entry management method may be applied to a flow entry management system in the embodiment of the present disclosure. The flow entry management system may include at least one switch and at least one controller, where for any switch in the at least one switch, one or more controllers in the at least one controller are connected to the any switch, and a corresponding management authority level relative to the any switch is set for each controller in the one or more controllers connected to the any switch. In an embodiment, the flow entry management method may include the following steps.

Step 101: After receiving a management instruction initiated by a first controller for a first flow entry, a first switch obtains a management authority level of the first controller relative to the first switch and a security level of the first flow entry.

In the embodiment of the present disclosure, corresponding to different management instructions, corresponding security levels are respectively set for the first flow entry, the security level may be used to indicate a management authority level that the controller should have for managing the first flow entry, the first switch is any switch in the at least one switch included in the flow entry management system, the first controller is any controller in one or more controllers connected to the first switch, and the first flow entry is any to-be-created flow entry carried in the management instruction initiated by the first controller or is any created flow entry stored on the first switch.

Further, it should be noted that in the embodiment of the present disclosure, unless otherwise specified, each switch included in the flow entry management system generally refers to an OPENFLOW switch. This is not repeated in the embodiment of the present disclosure.

Further, in the embodiment of the present disclosure, the management instruction initiated by the first controller and received by the first switch may be a creation instruction, a deletion instruction, a modification instruction, or a viewing instruction, or the like, which is not limited in the embodiment of the present disclosure. In addition, the management instruction initiated by the first controller may generally carry information such as a network protocol address of the first controller and a match field of the first flow entry that the management instruction initiated by the first controller is for. In addition, it should be noted that the management instruction initiated by the first controller may further carry information such as a corresponding mask character, such that fuzzy matching of the flow entry is performed, or the like. This is not limited in the embodiment of the present disclosure.

Further, it should be noted that the match field of the flow entry that is carried in the management instruction initiated by the first controller may be a match field of one or more flow entries. That is, in the embodiment of the present disclosure, the management instruction initiated by the first controller may be a management instruction for one flow entry or multiple flow entries, and this is not limited in the embodiment of the present disclosure.

Further, in the embodiment of the present disclosure, for any switch included in the flow entry management system, namely, the first switch, generally, configuration of a management authority level that is of each controller in the one or more controllers connected to the first switch and is relative to the first switch, may be completed by a configuration point (for example, an OPENFLOW Configuration Point). The configuration point may be an independent network element or may be an integrated network element integrated in a corresponding controller, which is not limited in the embodiment of the present disclosure.

In an embodiment, in the embodiment of the present disclosure, for any switch included in the flow entry management system, namely, the first switch, the configuration point may configure, in the following manner, the management authority level that is of each controller connected to the first switch and is relative to the first switch dividing the controllers connected to the first switch, into multiple authority levels according to magnitudes of operation authorities that are of the controllers connected to the first switch and are relative to the first switch, and configuring, according to corresponding authority levels of the controllers connected to the first switch, corresponding management authority levels relative to the first switch for the controllers connected to the first switch.

The management authority levels that are configured for the controllers connected to the first switch and are relative to the first switch, are generally different from each other. For example, two or more controllers may have a same management authority level relative to the first switch. This is not limited in the embodiment of the present disclosure.

In addition, it should be noted that in the embodiment of the present disclosure, for any controller, management authority levels of the controller relative to different switches to which the controller is connected may be the same or different, which may be set according to an actual situation and is also not limited in the embodiment of the present disclosure.

Further, in the embodiment of the present disclosure, for any switch included in the flow entry management system, namely, the first switch, when or after configuring the management authority level that is of each controller connected to the first switch and is relative to the first switch, the configuration point may further configure information such as a network protocol address of each controller connected to the first switch (or other identifier information of each controller, which may be used to uniquely identify each controller).

Further, when or after configuring the management authority level that is of each controller connected to the first switch and is relative to the first switch, and the information such as the network protocol address of each controller connected to the first switch, the configuration point may notify, to the first switch by communicating and interacting with the first switch, the configured management authority level that is of each controller connected to the first switch and is relative to the first switch, and the information such as the network protocol address of each controller connected to the first switch, such that the first switch learns and stores, according to the information received from the configuration point, the management authority level that is of each controller connected to the first switch and is relative to the first switch, and the information such as the network protocol address of each controller connected to the first switch.

It should be noted that in the embodiment of the present disclosure, for any switch included in the flow entry management system, namely, the first switch, after receiving the management authority level that is of each controller connected to the first switch and is relative to the first switch, and the information such as the network protocol address of each controller connected to the first switch, the first switch may establish, according to the received information, an association relationship between the management authority level that is of each controller connected to the first switch and is relative to the first switch, and the network protocol address of each controller connected to the first switch (or the other identifier information of each controller, which may be used to uniquely identify each controller), and correspondingly store, in a manner of storing the association relationship locally, the received management authority level that is of each controller connected to the first switch and is relative to the first switch, and the information such as the network protocol address of each controller connected to the first switch. This is not limited in the embodiment of the present disclosure.

In the embodiment of the present disclosure, for any switch included in the flow entry management system, namely, the first switch, that after receiving a management instruction initiated by a first controller for a first flow entry, the first switch obtains a management authority level of the first controller relative to the first switch, may include querying, according to the network protocol address of the first controller that is carried in the management instruction initiated by the first controller and the pre-established association relationship, for a management authority level corresponding to the network protocol address of the first controller that is carried in the management instruction initiated by the first controller, where the pre-established association relationship exists between the management authority level that is of each controller connected to the first switch and is relative to the first switch, and the network protocol address of each controller connected to the first switch, and using the found management authority level as the obtained management authority level of the first controller relative to the first switch.

Further, in the embodiment of the present disclosure, for any switch included in the flow entry management system, namely, the first switch, after the configuration point configures, on the first switch, the management authority level that is of each controller connected to the first switch and is relative to the first switch, and the network protocol address of each controller connected to the first switch, the configured management authority level that is of each controller connected to the first switch and is relative to the first switch and the network protocol address of each controller connected to the first switch may be sent to a corresponding controller, such that each controller locally stores configuration information related to the controller such as the management authority level.

In an embodiment, in the embodiment of the present disclosure, for any controller in the at least one controller connected to the first switch, namely, the first controller, the first controller may request, after establishing a corresponding session connection (such as an OPENFLOW session connection) with the first switch, the management authority level of the first controller relative to the first switch from the first switch in a manner of sending an authority obtaining request message (such as an authority_request message) to the first switch. After receiving the authority obtaining request message, the first switch may search, according to the network protocol address of the first controller, for the locally stored management authority level corresponding to the network protocol address, and return the corresponding management authority level to the first controller in a manner of returning an authority reply message (such as an authority_reply message) carrying the corresponding management authority level to the first controller. This is not repeated in the embodiment of the present disclosure.

Further, in the embodiment of the present disclosure, for any to-be-created flow entry carried in the management instruction initiated by the first controller or any created flow entry stored on the first switch, namely, the first flow entry, security levels of the first flow entry corresponding to different management instructions may be generally pre-configured by a corresponding controller according to importance and privacy of the first flow entry when the corresponding controller delivers a creation instruction for the first flow entry.

In an embodiment, the security level of the first flow entry may include a first security level of the first flow entry corresponding to a content modification management instruction and/or a second security level of the first flow entry corresponding to a content viewing management instruction. The content modification management instruction may include at least one or more of a creation instruction, a modification instruction, or a deletion instruction, and the content viewing management instruction includes at least a viewing instruction. This is not limited in the embodiment of the present disclosure.

In addition, it should be noted that in consideration of security, in principle, during the configuration of the security level of the first flow entry, the configured first security level of the first flow entry corresponding to the content modification management instruction should not be lower than the configured second security level of the first flow entry corresponding to the content viewing management instruction. This is not repeated in the embodiment of the present disclosure.

Further, it should be noted that in the embodiment of the present disclosure, because security levels configured for any two flow entries are generally different from each other, for ease of distinguishing a security level of each flow entry, generally, when a corresponding security level is configured for each flow entry, a corresponding controller pre-establishes an association relationship between the security level of each flow entry and a match field of each flow entry (or other identifier information of each flow entry, which may uniquely indicate each flow entry). Therefore, subsequently, according to information such as a match field of any flow entry, a security level corresponding to the flow entry may be determined. This is not repeated in the embodiment of the present disclosure.

After receiving the management instruction initiated by the first controller for the first flow entry, the first switch may obtain the security level of the first flow entry in the following manner: querying, according to the match field of the first flow entry that is carried in the management instruction initiated by the first controller and the pre-established association relationship between the security level of each flow entry and the match field of each flow entry, for a security level corresponding to the match field of the first flow entry that is carried in the management instruction initiated by the first controller, and using the found security level as the obtained security level of the first flow entry.

Further, it should be noted that in the embodiment of the present disclosure, when the first flow entry is any to-be-created flow entry carried in the management instruction initiated by the first controller, an association relationship between the security level of the first flow entry and the match field of the first flow entry may be carried in the management instruction initiated by the first controller. In this case, the first switch may obtain the security level of the first flow entry in a manner of querying, according to the match field of the first flow entry that is carried in the management instruction initiated by the first controller, for the security level that is carried in the management instruction initiated by the first controller and corresponds to the match field of the first flow entry. This is not repeated in the embodiment of the present disclosure.

Further, it should be noted that in the embodiment of the present disclosure, when the first flow entry is any created flow entry stored on the first switch, the association relationship between the security level of the first flow entry and the match field of the first flow entry may be stored on the first switch. In this case, the first switch may obtain the security level of the first flow entry in a manner of querying for the security level stored on the first switch and corresponding to the match field of the first flow entry. This is also not repeated in the embodiment of the present disclosure.

Step 102: The first switch compares the management authority level of the first controller relative to the first switch with the security level of the first flow entry corresponding to the management instruction initiated by the first controller, and if it is determined that the management authority level of the first controller relative to the first switch is not lower than the security level of the first flow entry corresponding to the management instruction initiated by the first controller, determines that the first controller has an authority to perform corresponding management on the first flow entry, and performs corresponding management on the first flow entry according to the management instruction initiated by the first controller.

In an embodiment, the security level of the first flow entry obtained by the first switch may include the first security level of the first flow entry corresponding to the content modification management instruction and/or the second security level of the first flow entry corresponding to the content viewing management instruction, which may be decided according to a feature of the management instruction initiated by the first controller. This is not limited in the embodiment of the present disclosure.

For example, when the management instruction initiated by the first controller is a creation instruction, the security level of the first flow entry obtained by the first switch may generally include the first security level of the first flow entry and the second security level of the first flow entry. That is, in this case, the first switch may generally obtain all security levels of the first flow entry. It should be noted that in this case, the management instruction initiated by the first controller may be generally initiated in a form of a flow_mod (OFPFC_ADD) message. This is not repeated in the embodiment of the present disclosure.

In addition, it should be noted that in this case, the first security level of the first flow entry and the second security level of the first flow entry may be pre-configured by the first controller according to importance and privacy of the first flow entry, in addition, the first security level of the first flow entry and the second security level of the first flow entry may be carried simultaneously in the flow_mod (OFPFC_ADD) message and sent to the first switch, such that the first switch obtains the corresponding first security level and second security level in a manner of querying for the security level carried in the flow_mod (OFPFC_ADD) message and corresponding to the match field of the first flow entry. This is also not repeated in the embodiment of the present disclosure.

When the management instruction initiated by the first controller is a creation instruction, the comparing the management authority level of the first controller relative to the first switch with the security level of the first flow entry corresponding to the management instruction initiated by the first controller, and if it is determined that the management authority level of the first controller relative to the first switch is not lower than the security level of the first flow entry corresponding to the management instruction initiated by the first controller, determining that the first controller has an authority to perform corresponding management on the first flow entry, may include comparing the management authority level of the first controller relative to the first switch with the first security level of the first flow entry, and if it is determined that the management authority level of the first controller relative to the first switch is not lower than the first security level of the first flow entry, determining that the first controller has an authority to perform corresponding creation on the first flow entry.

Further, when the management instruction initiated by the first controller is a creation instruction, when it is determined that the first controller has the authority to perform corresponding management on the first flow entry, the performing corresponding management on the first flow entry according to the management instruction initiated by the first controller may include creating the first flow entry locally on the first switch according to the management instruction initiated by the first controller, and writing the security level of the first flow entry that is carried in the management instruction initiated by the first controller, into a pre-added flow entry authority field of the first flow entry, where the pre-added flow entry authority field of the first flow entry may include a first authority field and a second authority field, and When the operation of writing the security level of the first flow entry is performed, the first security level of the first flow entry and the second security level of the first flow entry may be written into the first authority field and the second authority field of the flow entry respectively.

Further, it should be noted that, to ensure correctness of the created first flow entry itself, when the management instruction initiated by the first controller is a creation instruction, when or after it is determined that the management authority level of the first controller relative to the first switch is not lower than the first security level of the first flow entry, and before corresponding management is performed on the first flow entry according to the management instruction initiated by the first controller, the method may further include comparing the first security level of the first flow entry with the second security level of the first flow entry, and determining that the first security level of the first flow entry is not lower than the second security level of the first flow entry.

That is, when the operation of creating the first flow entry is performed, in addition to ensuring that the management authority level of the first controller relative to the first switch is not lower than the security level of the first flow entry corresponding to the management instruction initiated by the first controller, it is necessary to ensure that the first security level of the first flow entry is not lower than the second security level of the first flow entry, for the purpose of avoiding failure in performing an operation of creating a corresponding flow entry due to a pre-configured incorrect security level of the first flow entry.

In addition, it should be noted that when the management instruction initiated by the first controller is a creation instruction initiated for multiple flow entries, for each flow entry, whether the first controller has an authority to perform creation management on the flow entry may be determined according to the authority determining manner in the embodiment of the present disclosure. This is not limited in the embodiment of the present disclosure. Further, after whether the first controller has the authority to perform creation management on each flow entry in the multiple flow entries is determined in sequence, and when it is determined that the first controller has the authority to perform creation management on at least one flow entry in the multiple flow entries, at least one corresponding flow entry may be created locally according to the management instruction initiated by the first controller, or every time when it is determined that the first controller has the authority to perform creation management on any flow entry in the multiple flow entries, any corresponding flow entry may be created locally according to the management instruction initiated by the first controller. This is not limited in the embodiment of the present disclosure.

Further, when the management instruction initiated by the first controller is a modification instruction or a deletion instruction, to improve information obtaining convenience and save resources for obtaining information, the security level of the first flow entry obtained by the first switch may include only the first security level of the first flow entry. It should be noted that in this case, the modification instruction or deletion instruction may be generally initiated in a form of a flow_mod (OFPFC_MODIF) message or a flow_mod (OFPFC_DELETE) message, in addition, in this case, the first security level of the first flow entry may be generally obtained in a manner of querying for the security level stored locally on the first switch and corresponding to the match field of the first flow entry. This is not repeated in the embodiment of the present disclosure.

When the management instruction initiated by the first controller is a modification instruction or a deletion instruction, the comparing the management authority level of the first controller relative to the first switch with the security level of the first flow entry corresponding to the management instruction initiated by the first controller, and if it is determined that the management authority level of the first controller relative to the first switch is not lower than the security level of the first flow entry corresponding to the management instruction initiated by the first controller, determining that the first controller has an authority to perform corresponding management on the first flow entry, may include comparing the management authority level of the first controller relative to the first switch with the first security level of the first flow entry, and if it is determined that the management authority level of the first controller relative to the first switch is not lower than the first security level of the first flow entry, determining that the first controller has an authority to perform corresponding modification or deletion on the first flow entry.

That is, when an operation such as modification or deletion is performed on the first flow entry, it is only necessary to ensure that the management authority level of the first controller relative to the first switch is not lower than the security level of the first flow entry corresponding to the management instruction such as modification or deletion.

Further, when the management instruction initiated by the first controller is a modification instruction or a deletion instruction, when it is determined that the first controller has the authority to perform corresponding management on the first flow entry, the performing corresponding management on the first flow entry according to the management instruction initiated by the first controller may include searching, according to the management instruction initiated by the first controller, for the first flow entry stored locally on the first switch, and performing corresponding modification or deletion processing on the found first flow entry. In an embodiment, the corresponding first flow entry may be searched for according to the match field of the first flow entry that is carried in the management instruction initiated by the first controller. This is not repeated in the embodiment of the present disclosure. In addition, it should be noted that in the embodiment of the present disclosure, the operation of searching for the corresponding flow entry according to the match field of the first flow entry that is carried in the management instruction initiated by the first controller may also be performed before whether the first controller has the authority to perform management on the corresponding flow entry is determined. This is not limited in the embodiment of the present disclosure.

In addition, it should be noted that when the management instruction initiated by the first controller is a modification instruction or a deletion instruction initiated for multiple flow entries, for each flow entry, whether the first controller has an authority to perform modification or deletion management on the flow entry may be determined according to the authority determining manner in the embodiment of the present disclosure. This is not limited in the embodiment of the present disclosure. Further, every time when it is determined that the first controller has an authority to perform modification or deletion management on any flow entry in the multiple flow entries, the any flow entry stored locally may be searched for according to the management instruction initiated by the first controller, and corresponding modification or deletion processing is performed on the found any flow entry. This is not limited in the embodiment of the present disclosure.

Further, when the management instruction initiated by the first controller is a modification instruction, the management instruction initiated by the first controller may generally further carry modification content information of modification performed on the corresponding flow entry. This is not repeated in the embodiment of the present disclosure.

Further, when the management instruction initiated by the first controller is a viewing instruction, to improve information obtaining convenience and save resources for obtaining information, the security level of the first flow entry obtained by the first switch may include only the second security level of the first flow entry. It should be noted that because after the first flow entry is created, the first security level corresponding to the first flow entry is generally not lower than the second security level corresponding to the first flow entry, in this case, the first switch may also obtain only the first security level of the first flow entry, or may also obtain the first security level of the first flow entry and the second security level of the first flow entry simultaneously. This is not limited in the embodiment of the present disclosure. In addition, it should be noted that in this case, the viewing instruction may be generally initiated in a form of a multipart (ofp_flow_stats_request) message. In addition, in this case, the first security level of the first flow entry or the second security level of the first flow entry may be generally obtained in a manner of querying for the security level stored locally on the first switch and corresponding to the match field of the first flow entry. This is not repeated in the embodiment of the present disclosure.

When the management instruction initiated by the first controller is a viewing instruction, the comparing the management authority level of the first controller relative to the first switch with the security level of the first flow entry corresponding to the management instruction initiated by the first controller, and if it is determined that the management authority level of the first controller relative to the first switch is not lower than the security level of the first flow entry corresponding to the management instruction initiated by the first controller, determining that the first controller has an authority to perform corresponding management on the first flow entry, may include comparing the management authority level of the first controller relative to the first switch with the second security level of the first flow entry (or the first security level of the first flow entry), and if it is determined that the management authority level of the first controller relative to the first switch is not lower than the second security level of the first flow entry (or if it is determined that the management authority level of the first controller relative to the first switch is not lower than the first security level of the first flow entry), determining that the first controller has an authority to view the first flow entry.

That is, when the operation of viewing the first flow entry is performed, it is only necessary to ensure that the management authority level of the first controller relative to the first switch is not lower than the second security level of the first flow entry (or the first security level of the first flow entry).

Further, when the management instruction initiated by the first controller is a viewing instruction, when it is determined that the first controller has the authority to perform corresponding management on the first flow entry, the performing corresponding management on the first flow entry according to the management instruction initiated by the first controller may include searching, according to the management instruction initiated by the first controller, for the first flow entry stored locally on the first switch, and returning the found first flow entry to the first controller, such that the first controller performs corresponding viewing processing on the first flow entry.

It should be noted that when the management instruction initiated by the first controller is a viewing instruction initiated for multiple flow entries, for each flow entry, whether the first controller has an authority to perform viewing management on the flow entry may be determined according to the authority determining manner in the embodiment of the present disclosure. This is not limited in the embodiment of the present disclosure. Further, after whether the first controller has the authority to perform viewing management on each flow entry in the multiple flow entries is determined in sequence, and when it is determined that the first controller has the authority to perform viewing management on at least one flow entry in the multiple flow entries, the at least one flow entry stored locally may be searched for according to the management instruction initiated by the first controller, and the found at least one flow entry is returned to the first controller. In an embodiment, in this case, the at least one flow may be returned to the first controller in a manner of assembling the at least one flow entry into an ofp_multipart_reply (ofp_flow_stats) message. Alternatively, every time when it is determined that the first controller has the authority to perform viewing management on any flow entry in the multiple flow entries, the any flow entry stored locally may be searched for according to the management instruction initiated by the first controller, and the found any flow entry is returned to the first controller. This is not limited in the embodiment of the present disclosure.

In addition, it should be noted that in the embodiment of the present disclosure, after it is determined that the first controller has the authority to perform management on the first flow entry, and corresponding management is performed on the first flow entry according to the management instruction initiated by the first controller, a first response message indicating management success or management failure may be further returned to the first controller. This is not limited in the embodiment of the present disclosure.

Further, in the embodiment of the present disclosure, the method may include the following steps: if the first switch determines that the management authority level of the first controller relative to the first switch is lower than the security level of the first flow entry corresponding to the management instruction initiated by the first controller, determining that the first controller does not have the authority to perform corresponding management on the first flow entry, and refusing to execute the operation of performing corresponding management on the first flow entry according to the management instruction initiated by the first controller.

In an embodiment, in a manner of returning, to the first controller, a second response message for indicating that the first controller does not have the authority to perform management on the first flow entry, the first switch may refuse to execute the operation of performing corresponding management on the first flow entry according to the management instruction initiated by the first controller. This is not repeated in the embodiment of the present disclosure.

Embodiment 1 of the present disclosure provides a flow entry management method. In the technical solution of Embodiment 1 of the present disclosure, after receiving a management instruction for any flow entry, where the management instruction is initiated by any controller connected to any switch, the any switch may first determine, according to an obtained management authority level of the any controller relative to the any switch and a security level of the any flow entry, whether the management authority level of the any controller relative to the any switch is not lower than the security level of the any flow entry corresponding to the management instruction initiated by the any controller, and when a determining result is yes, determine that the any controller has an authority to perform corresponding management on the any flow entry, and perform corresponding management on the any flow entry according to the management instruction initiated by the any controller, thereby achieving an objective of effectively protecting the flow entry and further improving system security on a basis of avoiding an operation phenomenon of arbitrarily deleting or modifying the flow entry and the like.

In addition, in the technical solution of Embodiment 1 of the present disclosure, operations such as configuring a management authority level of a controller relative to a switch and determining an authority may further achieve an effect of isolating flow entries of multiple controllers on a same switch, such that other controllers cannot operate a flow entry created by the controller.

Embodiment 2

Embodiment 2 of the present disclosure provides a switch that may be used to implement the method shown in Embodiment 1 of the present disclosure. The switch may be applied to a flow entry management system. The flow entry management system may include at least one such switch in Embodiment 2 of the present disclosure and at least one controller, where one or more controllers in the at least one controller are connected to the switch, and a corresponding management authority level relative to the switch is set for each controller in the one or more controllers connected to the switch.

Figure 2:
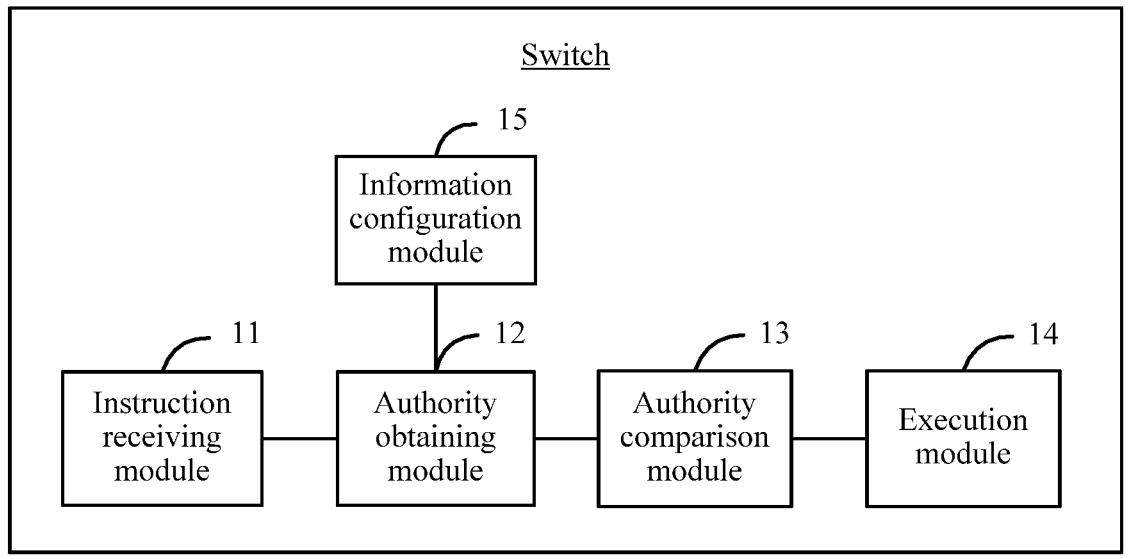
FIG. 2 is a schematic structural diagram according to Embodiment 2 of the present disclosure.

FIG. 2 is a schematic structural diagram of the switch in Embodiment 2 of the present disclosure, where the switch may include an instruction receiving module 11, an authority obtaining module 12, an authority comparison module 13, and an execution module 14.

The instruction receiving module 11 may be configured to receive a management instruction initiated by a first controller for a first flow entry, where the first controller is any controller in the one or more controllers connected to the switch, and the first flow entry is any to-be-created flow entry carried in the management instruction initiated by the first controller or is any created flow entry stored on the switch.

The authority obtaining module 12 may be configured to obtain a management authority level of the first controller relative to the switch and a security level of the first flow entry after the instruction receiving module 11 receives the management instruction initiated by the first controller, where, corresponding to different management instructions, corresponding security levels are respectively set for the first flow entry, and the security level is used to indicate a management authority level that the controller should have for managing the first flow entry.

The authority comparison module 13 may be configured to compare, according to the management authority level of the first controller relative to the switch and the security level of the first flow entry that are obtained by the authority obtaining module 12, the management authority level of the first controller relative to the switch with the security level of the first flow entry corresponding to the management instruction initiated by the first controller, to determine whether the management authority level of the first controller relative to the switch is not lower than the security level of the first flow entry corresponding to the management instruction initiated by the first controller.

The execution module 14 may be configured to, when the authority comparison module 13 determines that the management authority level of the first controller relative to the switch is not lower than the security level of the first flow entry corresponding to the management instruction initiated by the first controller, determine that the first controller has an authority to perform corresponding management on the first flow entry, and perform corresponding management on the first flow entry according to the management instruction initiated by the first controller.

In the embodiment of the present disclosure, the management instruction initiated by the first controller and received by the instruction receiving module 11 may be a creation instruction, a deletion instruction, a modification instruction, a viewing instruction, or the like, which is not limited in the embodiment of the present disclosure. In addition, the management instruction initiated by the first controller may generally carry information such as a network protocol address of the first controller and a match field of the first flow entry that the management instruction initiated by the first controller is for. In addition, it should be noted that the management instruction initiated by the first controller may further carry information such as a corresponding mask character, such that fuzzy matching of the flow entry is performed, or the like. This is not limited in the embodiment of the present disclosure.

Further, it should be noted that the match field of the flow entry that is carried in the management instruction initiated by the first controller may be a match field of one or more flow entries. That is, in the embodiment of the present disclosure, the management instruction initiated by the first controller may be a management instruction for one flow entry or multiple flow entries, and this is not limited in the embodiment of the present disclosure.

Further, in the embodiment of the present disclosure, the switch may include an information configuration module 15.

The information configuration module 15 may be configured to learn, in a manner of communicating and interacting with a configuration point, the management authority level that is of each controller connected to the switch and is relative to the switch, and information such as a network protocol address of each controller connected to the switch that are configured by the configuration point.

The management authority levels that are configured for the controllers connected to the switch and are relative to the switch, are generally different from each other. Certainly, particularly, two or more controllers may have a same management authority level relative to the switch. This is not limited in the embodiment of the present disclosure.

In addition, it should be noted that in the embodiment of the present disclosure, for any controller, management authority levels of the controller relative to different switches to which the controller is connected may be the same or different, which may be set according to an actual situation and is also not limited in the embodiment of the present disclosure.

Further, the information configuration module 15 may be further configured to establish, according to the received management authority level that is of each controller connected to the switch and is relative to the switch, and the information such as the network protocol address of each controller connected to the switch, an association relationship between the management authority level that is of each controller connected to the switch and is relative to the switch, and the network protocol address of each controller connected to the switch, and store, in a manner of storing the association relationship, the received management authority level that is of each controller connected to the switch and is relative to the switch, and the information such as the network protocol address of each controller connected to the switch.

The authority obtaining module 12 may be configured to, after the management instruction initiated by the first controller for the first flow entry is received, query, according to the network protocol address of the first controller that is carried in the management instruction initiated by the first controller and the association relationship, for a management authority level corresponding to the network protocol address of the first controller that is carried in the management instruction initiated by the first controller, where the association relationship is pre-established by the information configuration module 15 between the management authority level that is of each controller connected to the switch and is relative to the switch, and the network protocol address of each controller connected to the switch, and use the found management authority level as the obtained management authority level of the first controller relative to the switch.

Further, in the embodiment of the present disclosure, security levels of the first flow entry corresponding to different management instructions may be generally pre-configured by a corresponding controller according to importance and privacy of the first flow entry when the corresponding controller delivers a creation instruction for the first flow entry. In an embodiment, the security level of the first flow entry may include a first security level of the first flow entry corresponding to a content modification management instruction and/or a second security level of the first flow entry corresponding to a content viewing management instruction. The content modification management instruction may include at least one or more of a creation instruction, a modification instruction, or a deletion instruction, and the content viewing management instruction includes at least a viewing instruction. This is not limited in the embodiment of the present disclosure.

In addition, it should be noted that in consideration of security, in principle, during the configuration of the security level of the first flow entry, the configured first security level of the first flow entry corresponding to the content modification management instruction should not be lower than the configured second security level of the first flow entry corresponding to the content viewing management instruction. This is not repeated in the embodiment of the present disclosure.

Further, in the embodiment of the present disclosure, because security levels configured for any two flow entries are generally different from each other, for ease of distinguishing a security level of each flow entry, generally, when a corresponding security level is configured for each flow entry, an association relationship between the security level of each flow entry and a match field of each flow entry may be pre-established. The authority obtaining module 12 may be configured to, after the management instruction initiated by the first controller for the first flow entry is received, query, according to the match field of the first flow entry that is carried in the management instruction initiated by the first controller and the pre-established association relationship between the security level of each flow entry and the match field of each flow entry, for a security level corresponding to the match field of the first flow entry that is carried in the management instruction initiated by the first controller, and use the found security level as the obtained security level of the first flow entry. When the first flow entry is any to-be-created flow entry carried in the management instruction initiated by the first controller, a preset association relationship between the security level of the first flow entry and the match field of the first flow entry may be carried in the management instruction initiated by the first controller, or when the first flow entry is any created flow entry stored on the switch, a preset association relationship between the security level of the first flow entry and the match field of the first flow entry may be stored on the switch.

It should be noted that the security level of the first flow entry obtained by the authority obtaining module 12 may include the first security level of the first flow entry corresponding to the content modification management instruction and/or the second security level of the first flow entry corresponding to the content viewing management instruction, which may be decided according to a feature of the management instruction initiated by the first controller. This is not limited in the embodiment of the present disclosure.

For example, when the management instruction initiated by the first controller is a creation instruction, the security level of the first flow entry obtained by the authority obtaining module 12 may generally include the first security level of the first flow entry and the second security level of the first flow entry, when the management instruction initiated by the first controller is a modification instruction or a deletion instruction, the security level of the first flow entry obtained by the authority obtaining module 12 may include only the first security level of the first flow entry, when the management instruction initiated by the first controller is a viewing instruction, the security level of the first flow entry obtained by the authority obtaining module 12 may include only the second security level of the first flow entry. This is not repeated in the embodiment of the present disclosure.

Further, the authority comparison module 13 may be configured to, when the management instruction initiated by the first controller is a creation instruction, a modification instruction, or a deletion instruction, compare the management authority level of the first controller relative to the switch with the first security level of the first flow entry, and if it is determined that the management authority level of the first controller relative to the switch is not lower than the first security level of the first flow entry, determine that the first controller has an authority to perform corresponding creation, modification, or deletion on the first flow entry, or may be configured to, when the management instruction initiated by the first controller is a viewing instruction, compare the management authority level of the first controller relative to the switch with the second security level of the first flow entry, and if it is determined that the management authority level of the first controller relative to the switch is not lower than the second security level of the first flow entry, determine that the first controller has an authority to view the first flow entry.

Further, the execution module 14 may be configured to, when the authority comparison module 13 determines that the first controller has the authority to perform corresponding management on the first flow entry, if it is determined that the management instruction initiated by the first controller is a creation instruction, create the first flow entry locally on the switch according to the management instruction initiated by the first controller, and write the security level of the first flow entry that is carried in the management instruction initiated by the first controller, into a pre-added flow entry authority field of the first flow entry, or may be configured to, when the authority comparison module 13 determines that the first controller has the authority to perform corresponding management on the first flow entry, if it is determined that the management instruction initiated by the first controller is a modification instruction or a deletion instruction, search, according to the management instruction initiated by the first controller, for the first flow entry stored locally on the switch, and perform corresponding modification or deletion processing on the found first flow entry, or may be configured to, when the authority comparison module 13 determines that the first controller has the authority to perform corresponding management on the first flow entry, if it is determined that the management instruction initiated by the first controller is a viewing instruction, search, according to the management instruction initiated by the first controller, for the first flow entry stored locally on the switch, and return the found first flow entry to the first controller.

In an embodiment, the pre-added flow entry authority field of the first flow entry may include a first authority field and a second authority field. The execution module 14 may be configured to, when the operation of writing the security level of the first flow entry is performed, write the first security level of the first flow entry and the second security level of the first flow entry into the first authority field and the second authority field of the flow entry respectively. This is not repeated in the embodiment of the present disclosure.

Further, it should be noted that in the embodiment of the present disclosure, to ensure correctness of the created first flow entry itself, the authority comparison module 13 may be further configured to, when the management instruction initiated by the first controller is a creation instruction, when or after it is determined that the management authority level of the first controller relative to the switch is not lower than the first security level of the first flow entry, and before the execution module 14 performs corresponding management on the first flow entry according to the management instruction initiated by the first controller, compare the first security level of the first flow entry with the second security level of the first flow entry, and determine that the first security level of the first flow entry is not lower than the second security level of the first flow entry.

That is, when the operation of creating the first flow entry is performed, in addition to ensuring that the management authority level of the first controller relative to the first switch is not lower than the security level of the first flow entry corresponding to the management instruction initiated by the first controller, it is necessary to ensure that the first security level of the first flow entry is not lower than the second security level of the first flow entry, for the purpose of avoiding failure in performing an operation of creating a corresponding flow entry due to a pre-configured incorrect security level of the first flow entry.

Further, in the embodiment of the present disclosure, the execution module 14 may be further configured to, when the authority comparison module 13 determines that the management authority level of the first controller relative to the switch is lower than the security level of the first flow entry corresponding to the management instruction initiated by the first controller, determine that the first controller does not have the authority to perform corresponding management on the first flow entry, and refuse to execute the operation of performing corresponding management on the first flow entry according to the management instruction initiated by the first controller.

Embodiment 2 of the present disclosure provides a switch that may be used to implement the flow entry management method in Embodiment 1 of the present disclosure. In the technical solution of Embodiment 2 of the present disclosure, after receiving a management instruction for any flow entry, where the management instruction is initiated by any controller connected to the switch, the switch may first determine, according to an obtained management authority level of the any controller relative to the switch and a security level of the any flow entry, whether the management authority level of the any controller relative to the switch is not lower than the security level of the any flow entry corresponding to the management instruction initiated by the any controller, and when a determining result is yes, determine that the any controller has an authority to perform corresponding management on the any flow entry, and perform corresponding management on the any flow entry according to the management instruction initiated by the any controller, thereby achieving an objective of effectively protecting the flow entry and further improving system security on a basis of avoiding an operation phenomenon of arbitrarily deleting or modifying the flow entry and the like.

In addition, in the technical solution of Embodiment 2 of the present disclosure, operations such as configuring a management authority level of a controller relative to a switch and determining an authority may further achieve an effect of isolating flow entries of multiple controllers on a same switch, such that other controllers cannot operate a flow entry created by the controller.

Embodiment 3

Embodiment 3 of the present disclosure provides a switch that may be used to implement the method shown in Embodiment 1 of the present disclosure. The switch may be applied to a flow entry management system. The flow entry management system may include at least one such switch in Embodiment 3 of the present disclosure and at least one controller, where one or more controllers in the at least one controller are connected to the switch, and a corresponding management authority level relative to the switch is set for each controller in the one or more controllers connected to the switch.

Figure 3:
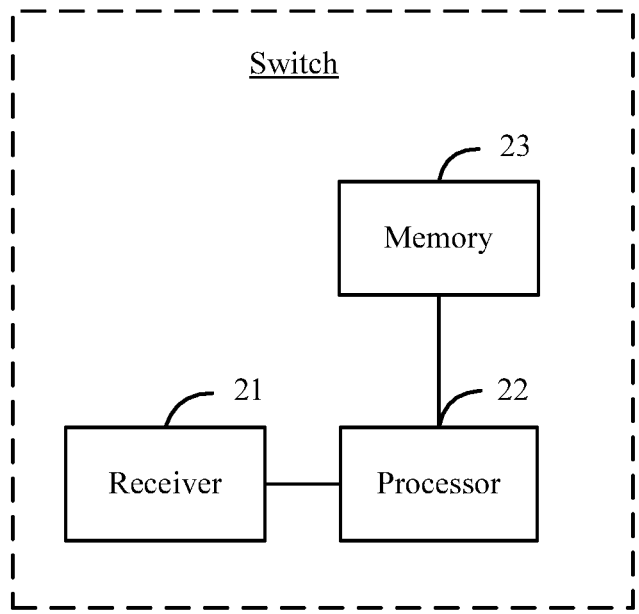
FIG. 3 is a schematic structural diagram according to Embodiment 3 of the present disclosure.

FIG. 3 is a schematic structural diagram of the switch according to Embodiment 3 of the present disclosure, where the switch may include components such as a receiver 21 and a processor 22. It is understandable to a person skilled in the art that a structure of the switch shown in FIG. 3 is not intended to limit the switch, and may further include components more or less than those shown in the figure, or combine some components, or have different component arrangements. This is not limited in the embodiment of the present disclosure.

In an embodiment, the following describes each component of the switch with reference to FIG. 3.

The receiver 21 may be configured to receive a management instruction initiated by a first controller for a first flow entry, where the first controller is any controller in the one or more controllers connected to the switch, and the first flow entry is any to-be-created flow entry carried in the management instruction initiated by the first controller or is any created flow entry stored on the switch.

The processor 22 may be configured to after the receiver 21 receives the management instruction initiated by the first controller, obtain a management authority level of the first controller relative to the switch and a security level of the first flow entry, compare the management authority level of the first controller relative to the switch with the security level of the first flow entry corresponding to the management instruction initiated by the first controller, and when it is determined that the management authority level of the first controller relative to the switch is not lower than the security level of the first flow entry corresponding to the management instruction initiated by the first controller, determine that the first controller has an authority to perform corresponding management on the first flow entry, and perform corresponding management on the first flow entry according to the management instruction initiated by the first controller.

Corresponding to different management instructions, corresponding security levels are respectively set for the first flow entry, and the security level is used to indicate a management authority level that the controller should have for managing the first flow entry.

In an embodiment, in the embodiment of the present disclosure, the management instruction initiated by the first controller and received by the receiver 21 may be a creation instruction, a deletion instruction, a modification instruction, a viewing instruction, or the like, which is not limited in the embodiment of the present disclosure. In addition, the management instruction initiated by the first controller may generally carry information such as a network protocol address of the first controller and a match field of the first flow entry that the management instruction initiated by the first controller is for. In addition, it should be noted that the management instruction initiated by the first controller may further carry information such as a corresponding mask character, such that fuzzy matching of the flow entry is performed, or the like. This is not limited in the embodiment of the present disclosure.

Further, it should be noted that the match field of the flow entry that is carried in the management instruction initiated by the first controller may be a match field of one or more flow entries. That is, in the embodiment of the present disclosure, the management instruction initiated by the first controller may be a management instruction for one flow entry or multiple flow entries, and this is not limited in the embodiment of the present disclosure.

Further, in the embodiment of the present disclosure, the processor 22 may be configured to learn, in a manner of communicating and interacting with a configuration point, the management authority level that is of each controller connected to the switch and is relative to the switch, and the information such as a network protocol address of each controller connected to the switch that are configured by the configuration point.

The management authority levels that are configured by the configuration point for the controllers connected to the switch and are relative to the switch, are generally different from each other. For example, two or more controllers may have a same management authority level relative to the switch. This is not limited in the embodiment of the present disclosure.

In addition, it should be noted that in the embodiment of the present disclosure, for any controller, management authority levels of the controller relative to different switches to which the controller is connected may be the same or different, which may be set according to an actual situation and is also not limited in the embodiment of the present disclosure.

Further, the processor 22 may be configured to establish, according to the received management authority level that is of each controller connected to the switch and is relative to the switch, and the information such as the network protocol address of each controller connected to the switch, an association relationship between the management authority level that is of each controller connected to the switch and is relative to the switch, and the network protocol address of each controller connected to the switch, and store, in a manner of storing the association relationship in a memory 23 of the switch, the received management authority level that is of each controller connected to the switch and is relative to the switch, and the information such as the network protocol address of each controller connected to the switch.

The memory 23 may be a read-only memory (ROM), another type of static storage device that can store static information and an instruction, a random access memory (RAM), or another type of dynamic storage device that can store information and an instruction, or may be an Electrically Erasable Programmable Read-Only Memory (EE-PROM), a Compact Disc Read-Only Memory (CD-ROM), another optical disk storage, optical disc storage (including a compact disc, a laser disc, an optical disc, a digital versatile disc, a Blu-ray® disc, and the like), or magnetic disk storage medium, or another magnetic storage device, or any other medium that can carry or store expected program code in a form of an instruction or a data structure and can be accessed by a computer, but the present disclosure is not limited thereto.

Further, the processor 22 may be configured to, after the management instruction initiated by the first controller for the first flow entry is received, query, according to the network protocol address of the first controller that is carried in the management instruction initiated by the first controller and the pre-established association relationship, for a management authority level corresponding to the network protocol address of the first controller that is carried in the management instruction initiated by the first controller, where the pre-established association relationship exists between the management authority level that is of each controller connected to the switch and is relative to the switch, and the network protocol address of each controller connected to the switch, and use the found management authority level as the obtained management authority level of the first controller relative to the switch.

Further, in the embodiment of the present disclosure, security levels of the first flow entry corresponding to different management instructions may be generally pre-configured by a corresponding controller according to importance and privacy of the first flow entry when the corresponding controller delivers a creation instruction for the first flow entry. In an embodiment, the security level of the first flow entry may include a first security level of the first flow entry corresponding to a content modification management instruction and/or a second security level of the first flow entry corresponding to a content viewing management instruction. The content modification management instruction may include at least one or more of a creation instruction, a modification instruction, or a deletion instruction, and the content viewing management instruction includes at least a viewing instruction. This is not limited in the embodiment of the present disclosure.

In addition, it should be noted that in consideration of security, in principle, during the configuration of the security level of the first flow entry, the configured first security level of the first flow entry corresponding to the content modification management instruction should not be lower than the configured second security level of the first flow entry corresponding to the content viewing management instruction. This is not repeated in the embodiment of the present disclosure.

Further, in the embodiment of the present disclosure, because security levels configured for any two flow entries are generally different from each other, for ease of distinguishing a security level of each flow entry, generally, when a corresponding security level is configured for each flow entry, an association relationship between the security level of each flow entry and a match field of each flow entry is generally established. The processor 22 may be configured to, after the management instruction initiated by the first controller for the first flow entry is received, query, according to the match field of the first flow entry that is carried in the management instruction initiated by the first controller and the pre-established association relationship between the security level of each flow entry and the match field of each flow entry, for a security level corresponding to the match field of the first flow entry that is carried in the management instruction initiated by the first controller, and use the found security level as the obtained security level of the first flow entry. When the first flow entry is any to-be-created flow entry carried in the management instruction initiated by the first controller, a preset association relationship between the security level of the first flow entry and the match field of the first flow entry may be carried in the management instruction initiated by the first controller, or when the first flow entry is any created flow entry stored on the first switch, a preset association relationship between the security level of the first flow entry and the match field of the first flow entry may be stored on the first switch.

It should be noted that the security level of the first flow entry obtained by the processor 22 may include the first security level of the first flow entry corresponding to the content modification management instruction and/or the second security level of the first flow entry corresponding to the content viewing management instruction, which may be decided according to a feature of the management instruction initiated by the first controller. This is not limited in the embodiment of the present disclosure.

For example, when the management instruction initiated by the first controller is a creation instruction, the security level of the first flow entry obtained by the processor 22 may generally include the first security level of the first flow entry and the second security level of the first flow entry, when the management instruction initiated by the first controller is a modification instruction or a deletion instruction, the security level of the first flow entry obtained by the processor 22 may include only the first security level of the first flow entry, when the management instruction initiated by the first controller is a viewing instruction, the security level of the first flow entry obtained by the processor 22 may include only the second security level of the first flow entry. This is not repeated in the embodiment of the present disclosure.

Further, the processor 22 may be configured to, when the management instruction initiated by the first controller is a creation instruction, a modification instruction, or a deletion instruction, compare the management authority level of the first controller relative to the switch with the first security level of the first flow entry, and if it is determined that the management authority level of the first controller relative to the switch is not lower than the first security level of the first flow entry, determine that the first controller has an authority to perform corresponding creation, modification, or deletion on the first flow entry, or may be configured to, when the management instruction initiated by the first controller is a viewing instruction, compare the management authority level of the first controller relative to the switch with the second security level of the first flow entry, and if it is determined that the management authority level of the first controller relative to the switch is not lower than the second security level of the first flow entry, determine that the first controller has an authority to view the first flow entry.

Further, the processor 22 may be configured to, when it is determined that the first controller has the authority to perform corresponding management on the first flow entry, if it is determined that the management instruction initiated by the first controller is a creation instruction, create the first flow entry locally on the switch according to the management instruction initiated by the first controller, and write the security level of the first flow entry that is carried in the management instruction initiated by the first controller, into a pre-added flow entry authority field of the first flow entry, or may be configured to, when it is determined that the first controller has the authority to perform corresponding management on the first flow entry, if it is determined that the management instruction initiated by the first controller is a modification instruction or a deletion instruction, search, according to the management instruction initiated by the first controller, for the first flow entry stored locally on the switch, and perform corresponding modification or deletion processing on the found first flow entry, or may be configured to, when it is determined that the first controller has the authority to perform corresponding management on the first flow entry, if it is determined that the management instruction initiated by the first controller is a viewing instruction, search, according to the management instruction initiated by the first controller, for the first flow entry stored locally on the switch, and return the found first flow entry to the first controller.

In an embodiment, the pre-added flow entry authority field of the first flow entry may include a first authority field and a second authority field. The processor 22 may be configured to, when the operation of writing the security level of the first flow entry is performed, write the first security level of the first flow entry and the second security level of the first flow entry into the first authority field and the second authority field of the flow entry respectively. This is not repeated in the embodiment of the present disclosure.

Further, it should be noted that in the embodiment of the present disclosure, to ensure correctness of the created first flow entry itself, the processor 22 may be further configured to, when the management instruction initiated by the first controller is a creation instruction, when or after it is determined that the management authority level of the first controller relative to the switch is not lower than the first security level of the first flow entry, and before corresponding management is performed on the first flow entry according to the management instruction initiated by the first controller, compare the first security level of the first flow entry with the second security level of the first flow entry, and determine that the first security level of the first flow entry is not lower than the second security level of the first flow entry.

That is, when the operation of creating the first flow entry is performed, in addition to ensuring that the management authority level of the first controller relative to the first switch is not lower than the security level of the first flow entry corresponding to the management instruction initiated by the first controller, it is necessary to ensure that the first security level of the first flow entry is not lower than the second security level of the first flow entry, for the purpose of avoiding failure in performing an operation of creating a corresponding flow entry due to a pre-configured incorrect security level of the first flow entry.

Further, in the embodiment of the present disclosure, the processor 22 may be configured to, when it is determined that the management authority level of the first controller relative to the switch is lower than the security level of the first flow entry corresponding to the management instruction initiated by the first controller, determine that the first controller does not have the authority to perform corresponding management on the first flow entry, and refuse to execute the operation of performing corresponding management on the first flow entry according to the management instruction initiated by the first controller.

Embodiment 3 of the present disclosure provides a switch that may be used to implement the flow entry management method in Embodiment 1 of the present disclosure. In the technical solution of Embodiment 3 of the present disclosure, after receiving a management instruction for any flow entry, where the management instruction is initiated by any controller connected to the switch, the switch may first determine, according to an obtained management authority level of the any controller relative to the switch and a security level of the any flow entry, whether the management authority level of the any controller relative to the switch is not lower than the security level of the any flow entry corresponding to the management instruction initiated by the any controller, and when a determining result is yes, determine that the any controller has an authority to perform corresponding management on the any flow entry, and perform corresponding management on the any flow entry according to the management instruction initiated by the any controller, thereby achieving an objective of effectively protecting the flow entry and further improving system security on a basis of avoiding an operation phenomenon of arbitrarily deleting or modifying the flow entry and the like.

In addition, in the technical solution of Embodiment 3 of the present disclosure, operations such as configuring a management authority level of a controller relative to a switch and determining an authority may further achieve an effect of isolating flow entries of multiple controllers on a same switch, such that other controllers cannot operate a flow entry created by the controller.

Persons skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A flow entry management method implemented by a first switch in a flow entry management system, comprising:
   receiving, by the first switch, a management instruction from a first controller, the management instruction containing a first network protocol address of the first controller and a first match field of a first flow entry;
   in response to receiving the management instruction, obtaining, by the first switch, a first management authority level of the first controller relative to the first switch by querying for the first management authority level based on the first network protocol address and according to a preset relationship, wherein the preset relationship indicates relationships between a plurality of management authority levels of controllers connected to the first switch and network protocol addresses of the controllers connected to the first switch;
   in response to receiving the management instruction, obtaining, by the first switch, a first security level of the first flow entry by querying for the first security level of the first flow entry based on the first match field and according to a preset association relationship, wherein the preset association relationship indicates a security level of each flow entry and a match field of each flow entry, and wherein a plurality of security levels corresponding to different management instructions are respectively set for the first flow entry;
   comparing, by the first switch, the first management authority level of the first controller relative to the first switch with the first security level of the first flow entry corresponding to the management instruction initiated by the first controller; and
   performing, by the first switch, the management instruction on the first flow entry in response to determining that the first management authority level of the first controller relative to the first switch is not less than the first security level of the first flow entry corresponding to the management instruction.

2. The flow entry management method of claim 1, wherein the first security level of the first flow entry comprises at least one of a second security level of the first flow entry corresponding to a content modification management instruction or a third security level of the first flow entry corresponding to a content viewing management instruction, wherein the content modification management instruction comprises at least one of a creation instruction, a modification instruction, or a deletion instruction, and wherein the content viewing management instruction comprises at least a viewing instruction.

3. The flow entry management method of claim 2, wherein the management instruction is a content modification management instruction, and wherein the method further comprises determining, by the first switch, that the first controller has an authority to perform a corresponding creation, modification, or deletion on the first flow entry in response to the management instruction.

4. The flow entry management method of claim 2, wherein the management instruction is a content viewing management instruction, and wherein the method further comprises determining, by the first switch, that the first controller has an authority to view the first flow entry in response to the management instruction.

5. The flow entry management method of claim 2, wherein the management instruction is a creation instruction, and wherein performing the management instruction on the first flow entry comprises:
creating the first flow entry locally on the first switch according to the management instruction initiated by the first controller; and
writing the first security level of the first flow entry that is carried in the management instruction initiated by the first controller into a pre-added flow entry authority field of the first flow entry in response to the management instruction.

6. The flow entry management method of claim 2, wherein the management instruction is a modification instruction, and wherein performing the management instruction on the first flow entry comprises:
searching, according to the management instruction initiated by the first controller, for the first flow entry stored locally on the first switch; and
performing a corresponding modification processing on the first flow entry in response to the management instruction.

7. The flow entry management method of claim 2, wherein the management instruction is a deletion instruction, and wherein performing the management instruction on the first flow entry comprises:
searching, according to the management instruction initiated by the first controller, for the first flow entry stored locally on the first switch; and
performing a corresponding deletion processing on the first flow entry in response to the management instruction.

8. The flow entry management method of claim 2, wherein the management instruction is a viewing instruction, and wherein performing the management instruction on the first flow entry comprises:
searching, according to the management instruction, for the first flow entry stored locally on the first switch; and
returning the first flow entry to the first controller in response to the management instruction.

9. The flow entry management method of claim 1, wherein an association relationship between the first security level of the first flow entry and the first match field of the first flow entry is pre-established upon configuration of the first flow entry.

10. A switch implemented in a flow entry management system, comprising:
a receiver;
a memory configured to store instructions; and
a processor coupled to the memory and the receiver and configured to execute the instructions, which causes the processor to be configured to:
receive, via the receiver, a management instruction from a first controller, the management instruction containing a first network protocol address of the first controller and a first match field of a first flow entry;
in response to receiving the management instruction, obtain a first management authority level of the first controller by querying for the first management authority level based on the first network protocol address and according to a preset relationship, wherein the preset relationship indicates relationships between a plurality of management authority levels of controllers connected to the switch and network protocol addresses of the controllers connected to the switch, wherein the first management authority level is relative to the switch;
in response to receiving the management instruction, obtain a first security level of the first flow entry by querying for the first security level of the first flow entry based on the first match field and according to a preset association relationship, wherein the preset association relationship indicates a security level of each flow entry and a match field of each flow entry, and wherein a plurality of security levels corresponding to different management instructions are respectively set for the first flow entry;
compare the first management authority level of the first controller relative to the switch with the first security level of the first flow entry corresponding to the management instruction initiated by the first controller; and
perform the management instruction on the first flow entry in response to determining that the first management authority level of the first controller relative to the switch is not less than the first security level of the first flow entry corresponding to the management instruction.

11. The switch of claim 10, wherein the first security level of the first flow entry comprises at least one of a second security level of the first flow entry corresponding to a content modification management instruction or a third security level of the first flow entry corresponding to a content viewing management instruction, and the content modification management instruction comprises at least one of a creation instruction, a modification instruction, or a deletion instruction, and the content viewing management instruction comprises at least a viewing instruction.

12. The switch of claim 11, wherein the management instruction is a content modification management instruction, and wherein the processor is further configured to determine that the first controller has an authority to perform a corresponding creation, modification, or deletion on the first flow entry in response to the management instruction.

13. The switch of claim 11, wherein the management instruction is a content viewing management instruction, and wherein the processor is further configured to determine that the first controller has an authority to view the first flow entry in response to the management instruction.

14. The switch of claim 11, wherein the management instruction is a creation instruction, and wherein the processor is further configured to:
create the first flow entry locally on the switch according to the management instruction initiated by the first controller; and
write the first security level of the first flow entry that is carried in the management instruction initiated by the first controller into a pre-added flow entry authority field of the first flow entry in response to the management instruction.

15. The switch of claim 11, wherein the management instruction is a modification instruction, and wherein the processor is further configured to:
search, according to the management instruction initiated by the first controller, for the first flow entry stored locally on the switch; and
perform a corresponding modification processing on the first flow entry in response to the management instruction.

16. The switch of claim 11, wherein the management instruction is a deletion instruction, and wherein the processor is further configured to:
- search, according to the management instruction initiated by the first controller, for the first flow entry stored locally on the switch; and
- perform a corresponding deletion processing on the first flow entry in response to the management instruction.

17. The switch of claim 11, wherein the management instruction is a viewing instruction, and wherein the processor is further configured to:
- search, according to the management instruction, for the first flow entry stored locally on the switch; and
- return the first flow entry to the first controller in response to the management instruction.

18. The switch of claim 10, wherein an association relationship between the first security level of the first flow entry and the first match field of the first flow entry is pre-established upon configuration of the first flow entry.

* * * * *